United States Patent [19]

Overbye

[11] 4,177,647
[45] Dec. 11, 1979

[54] AIR SLIDE FREEZER SYSTEM

[75] Inventor: Milan R. Overbye, Bellevue, Wash.

[73] Assignee: Lewis Refrigeration Co., Redmond, Wash.

[21] Appl. No.: 840,011

[22] Filed: Oct. 6, 1977

[51] Int. Cl.² ............................................. F25D 13/06
[52] U.S. Cl. ............................................. 62/63; 62/57;
62/380; 62/381; 34/225; 406/88
[58] Field of Search ................. 62/57, 60, 63, 380, 62/381; 302/29, 31; 34/225

[56] References Cited

U.S. PATENT DOCUMENTS

| | | | |
|---|---|---|---|
| 2,275,588 | 3/1942 | Greene | 62/380 |
| 2,582,789 | 1/1952 | Morrison | 62/380 |
| 3,391,548 | 7/1968 | Gram | 62/381 |
| 3,477,242 | 11/1969 | Lamb et al. | 62/57 |
| 3,603,646 | 9/1971 | Leoff | 302/29 |
| 3,647,266 | 3/1972 | Hurd et al. | 302/31 |
| 3,691,644 | 9/1972 | Schnitzer | 62/57 |

*Primary Examiner*—Ronald C. Capossela
*Attorney, Agent, or Firm*—Christensen, O'Connor, Johnson & Kindness

[57] ABSTRACT

A method and system for preparing comestibles for frozen storage in which pressurized freezing air is utilized in conjunction with a substantially flat conveyance surface, both to aid in or contribute to the conveyance of the packages or containers as well as to effectuate the rapid freezing of the comestibles therein during the course of such conveyance through the system. In the preferred embodiment, the elongated conveyance deck is of space saving substantially helical form with successive descending turns underlying one another and with the space surrounded by the turns forming part of a plenum chamber into which pressurized freezing air is blown for admission into a laterally open plenum duct underlying the deck throughout its length. Such elongated plenum duct is tapered transversely beneath the deck for uniform distribution of pressurized freezing air to the discharge apertures in the deck by means of a transversely inclined duct-forming panel cooperating with the deck. On its upper side the panel forms the plenum duct and on its lower side the panel cooperates with a surrounding enclosure common to the helical turns of the conveyance deck to form a collecting chamber from which air is withdrawn by the combined freezing and pressurizing means for recirculation continuingly as the containers or packages descend by increments progressively down the helical path of the deck. A partition with variable damper means separates the central plenum chamber and the surrounding collecting chamber and provides a variable bypass to regulate or vary the flow of air through such discharge apertures and maintain constant airflow through refrigerated evaporator coils so as to maintain efficient heat exchange operation thereof. With the comestibles packaged in the usual manner so as to afford air space within the packages for expansion of the comestibles upon freezing, this method of combined conveyance and freezing by use of the pressurized air flow greatly accelerates the freezing process and effects conveyance of the comestibles, appropriately retarded to maintain relative high-velocity flow of air sweeping the packages, without necessity for mechanical conveyance devices.

14 Claims, 14 Drawing Figures

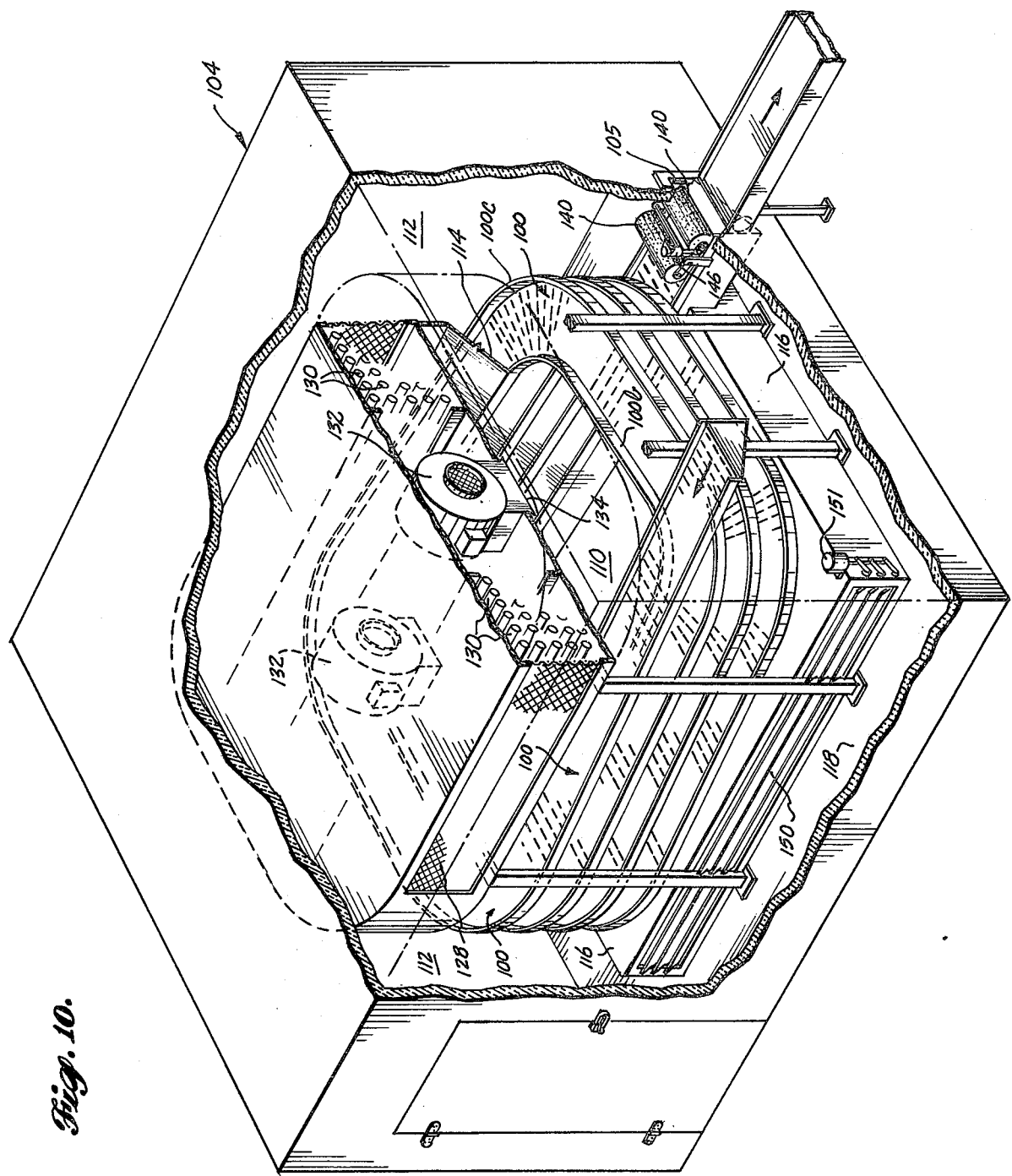

AIR SLIDE FREEZER SYSTEM

BACKGROUND OF THE INVENTION

This invention relates to an improved system and process for preparing comestibles for frozen storage and more particularly to a technique and means for implementation thereof by which a continuing commercial freezing operation may be carried out efficiently and without necessity for mechanically moving conveyance devices as in most, if not all prior flow-through systems. The invention is herein illustratively described by reference to the presently preferred embodiments thereof; however, it will be recognized that certain modifications and changes with respect to details may be made without departing from the essential features involved.

A variety of commercial freezing systems of the flow-through or conveyance line type has evolved over the years in which comestibles, packaged or unpackaged, have been successfully processed as an important area of technology in the food processing industry. In recent years the large part of this activity has been of the type referred to as individualized quick freezing (IQF) wherein the moist comestibles such as shelled peas, cut beans, carrot slices, berries, etc., are frozen before packaging. In those processes the comestibles are deposited on a moving foraminous conveyor means or a foraminous stationary deck in moist condition and are quickly frozen in a so-called "fluidized" state by pressurized freezing air blown upwardly against the individual comestibles causing them to vibrate and tumble in a loose or fluid-like condition as they advance along the conveyor or flow by gravity or otherwise along the supporting surface. The process is efficient and has the important advantage of sealing the individual articles by a quickly formed surface glaze, but in a manner avoiding clumping or agglomeration through ice bonding. Upon completion of the freezing, the discharging individually frozen articles are packaged and then stored for ultimate use. Examples of this technique appear in such prior art U.S. Pat. Nos. 3,477,242, Lamb, et al; 3,169,381, Persson; 2,223,972, Sterling; 3,115,756, Overbye; 3,166,383, Morris; 3,112,186, Davis et al; 3,267,585, Futer; 3,864,931 Guttinger; 3,394,463, Futer; 3,304,619, Futer; and 3,886,762, Rothstein, et al. In some of these and other prior art systems as indicated above, conveyance of the comestibles along the intended path through the freezing chamber is effected by the substantially frictionless gravity induced flow of the comestibles from the input end to the discharge end of the system, much as liquid flows from an initial elevation to a lower elevation. Therefore, it is not novel at this juncture to utilize pressurized freezing air to effect simultaneous conveyance and efficient freezing of comestibles in I.Q.F. (individual quick freezing) without the requirement for mechanically moving conveyor devices and their attendant cost and maintenance problems in such working environments.

However, for many applications it is desirable for a variety of reasons to package the comestibles before freezing. The common implementation of freezing processes for pre-packaged comestibles noted in background references to the present invention, in flow-through or conveyance line systems, employed mechanically moving conveyors for the packages and various arrangements for blowing pressurized freezing air over the surfaces of the packages to effect freezing. The principal problem with such systems has always been a two-fold one, namely, efficient freezing of the containerized comestibles in a short period and, secondly, the problem of cost and space requirements, together with maintenance problems of large mechanized installations. In this regard, it will be noted that the usual cardboard or plastic packages employed in the industry form an insulating barrier surrounding the comestibles retarding the rate at which heat can be withdrawn and that this retardation is further aggravated by the existence of air space within the container, usually at the top. Such air space is virtually unavoidable and is indeed desirable as an expansion space to prevent bulging and misshaping of the packages as the comestibles expand on freezing. With past practices, the freezing tunnel installations for pre-packaged comestibles became very long in order to afford an adequate holding period in which to effect complete freezing of the comestibles, thereby making the installation expensive. When adding to this the cost of installation and the associated maintenance problems of a mechanical conveyor system, such as a sprocket driven chain belt or the like, the total installation represented a major undertaking for any commercial processor desiring large volume production rates.

A central object of the present invention is to overcome these difficulties and limitations pertaining to the preparation of pre-packaged comestibles for frozen storage. More specifically, a broad object hereof is to devise a flow-through system and a process wherein containerized or pre-packaged comestibles may be frozen efficiently and quickly in an installation that utilizes a conveyor run of minimum length and more particularly, in an installation of such a conveyor run that occupies minimum floor space and dispenses altogether with the need for mechanically moving conveyor mechanisms.

A related or subsidiary object hereof is to devise such a system and process wherein the pressurized freezing air available from conventional or, if desired, specially designed devices, is utilized to maximum advantage and for multiple purposes in both the effective freezing of the packaged comestibles in a minimum time period and in effecting the conveyance of the comestibles during freezing. More specifically, the technique employs a means utilizing the packages themselves and an apertured conveyance deck cooperatively for partially entrapping and confining the flow of pressurized air against and along the package surfaces so as to withdraw heat from the comestibles through the package bottom and side walls at maximum rate while simultaneously suspending the packages on an air layer or film that also permits substantially frictionless conveyance and indeed, may partially propel the packages in the desired direction of conveyance. With the package lying flat supported on the high velocity film of air, maximum heat transfer rate is thus achieved by the freezing air inasmuch as it is primarily through the package bottoms and adjoining side walls of the packages that the potential for heat transfer is by far the greater. In addition, the invention employs an efficient means of the described nature that effectively utilizes gravity flow of the packages, together with a plenum and collecting system of ducting for the air in association with the multiply apertured conveyance deck that can be constructed at minimum cost and with minimum floor space requirements in a processing plant.

A further object hereof is to provide such a system that can be implemented in a highly simple and relatively small installation for economy applications by small processors, or as well can be implemented in a more elaborate and highly productive installation to even greater advantage, proportionately, for larger installations where volume of production or freezing requirements applied to larger packages so indicate.

Ease of accessibility for inspection, cleaning and troubleshooting, such as where packages accidentally become stuck or may tend to pile up within the system represents a further objective of the invention in its preferred embodiment. Likewise, controllability of freezing rate and/or pressurized freezing air flow rate in the system represents still another objective.

These and various other purposes of the invention will become more fully evident as the description proceeds.

BRIEF DESCRIPTION OF INVENTION

In accordance with this invention as herein disclosed, the preferred embodiment for most commercial applications wherein high production rates, low installations costs, faster heat transfer, minimum floor space requirements and similar specifications are of key importance, comprises an elongated conveyance deck having apertures distributed lengthwise thereof and formed in a substantially helical configuration with the successively descending turns of the helix lying one beneath another. Angularly disposed duct forming panels beneath the deck form part of a continuing plenum space which, in the illustrated case opens into the central interior plenum space surrounded and defined by the helical turns and into which pressurized air is delivered by the combined freezing and pressurizing apparatus. Comestibles in packages deposited on the upper end of the conveyance deck and relieved of restraining friction by the discharging air descend by gravity in a continuing train and are withdrawn from the lower end of the conveyance deck after passing intermittently operated gate means. Such gate means includes alternately actuatable stop elements that permit the packages to pass one or more at a time while holding back the gravity-conveyed train of packages behind the gate so as to permit their advance at a restricted or controlled rate assuring relative sweep of the packages by the freezing air for maximum rate of heat withdrawal. A surrounding enclosure cooperates with the substantially helical duct-forming panel and associated conveyance deck panel to form a collecting chamber from which air is withdrawn from between the turns of the deck for recirculation by the combined pressurizing and freezing apparatus.

In accordance with more basic features of the invention, the train of packages deposited on the conveyance deck abut one another and are preferably confined by adjoining sidewalls. The pressure of air delivered into the plenum is sufficient that the packages are elevated slightly above the deck to form an air layer beneath them. Air both forced upwardly through the deck apertures and withdrawn from this air layer by the section side of the circulating blower in the system is required to flow upwardly past the sidewalls of the packages where they abut one another and where they are adjoined by the side walls of the conveyance deck so as to maximize the flow of freezing air along those bottom and side wall surfaces of the packages against which the contained comestibles lie in contact. Air is not purposely blown across the top surfaces of the packages where the comestibles lie out of contact with the package walls because there is little to be gained by such inefficient use of the air in view of the insulating effect of the air layer usually found at the top of a package. Furthermore, the pressurized freezing air flows uniformly and rapidly along those surfaces at a fast rate, assured by the measured or retarded advance of the packages, with attendant effect of continuously breaking the stagnant surface layers on the package surfaces during the course of conveyance, and thus effects maximum rate of heat withdrawal from the comestibles throughout the process.

Preferably the discharge orifices in the conveyance deck are directed lengthwise of the deck in the direction of conveyance as well as upwardly so as to add conveyance force to whatever additional impelling force, if any, is used, such as the force of gravity, causing the train of packages to advance at a measured or controlled average pace along the deck. Inasmuch as the flowing air film is thin, and increasingly so with heavier packages requiring more freezing effect, freezing is rapid even though flow rates using large volumes of air are not required in the system. Inasmuch as the helically formed conveyance deck need occupy a very small amount of floor space for the capacity thereof by comparison with conventional conveyor type freezing tunnels, the building space-volumed requirements are also minimized. Moreover, the lack of necessity for mechanically moving conveyor mechanisms, greatly reduces the initial cost and greatly simplifies the maintenance and upkeep problems typical in most commercial systems.

By-pass control dampers are provided to establish the required volume pressure requirements of "floating" the packages on the conveyance deck without upsetting or tumbling them about, and at the same time to maintain substantially constant volume of air flow through the evaporator coil assembly as needed to assure maintaining evaporator efficiency according to well known requirements.

These and other advantages and features of the invention will appear as the preferred embodiments are described in a linear conveyance deck system and also in a helical turn type conveyance deck system.

BRIEF DESCRIPTION OF THE DRAWINGS

FIG. 10 is an isometric view with parts broken away showing the system of FIG. 4.

DETAILED DESCRIPTION OF PREFERRED EMBODIMENTS

Figure 1:
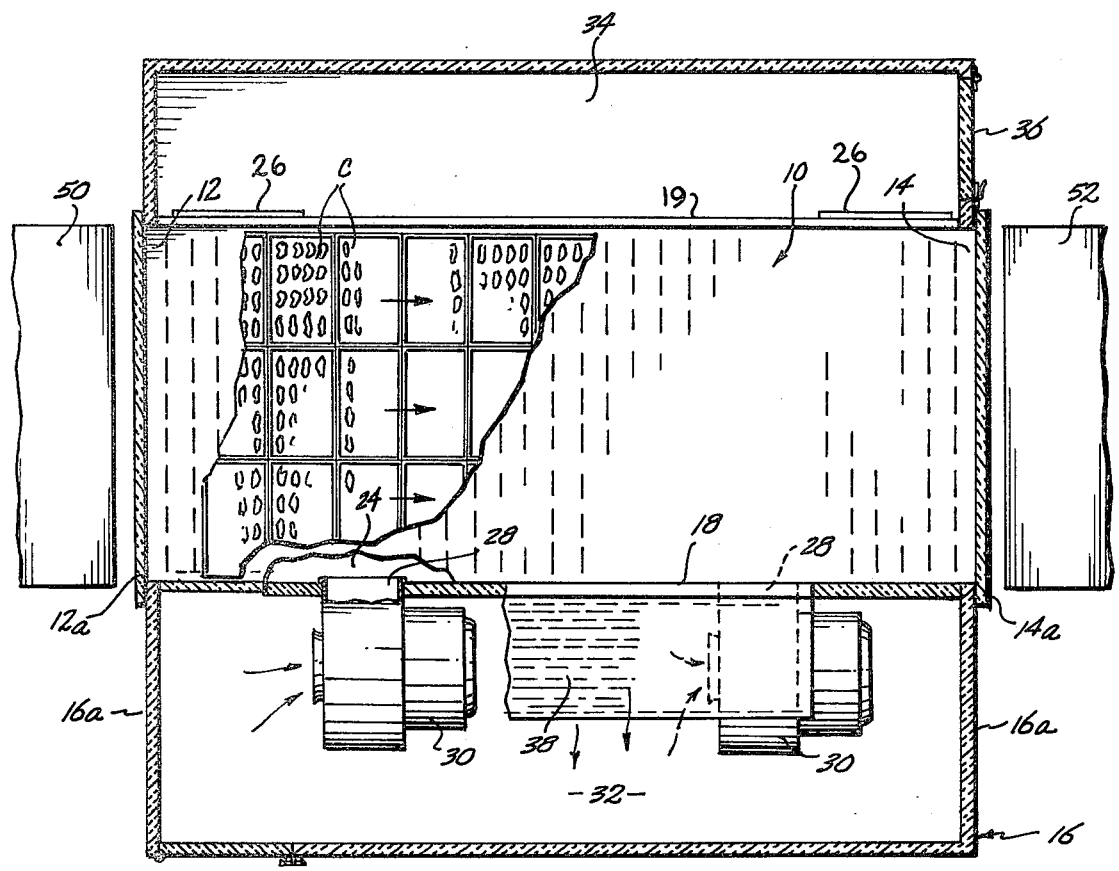
FIG. 1 is a plan view of an air slide conveyance freezer employing broad concepts of the invention in one embodiment.
Figure 2:
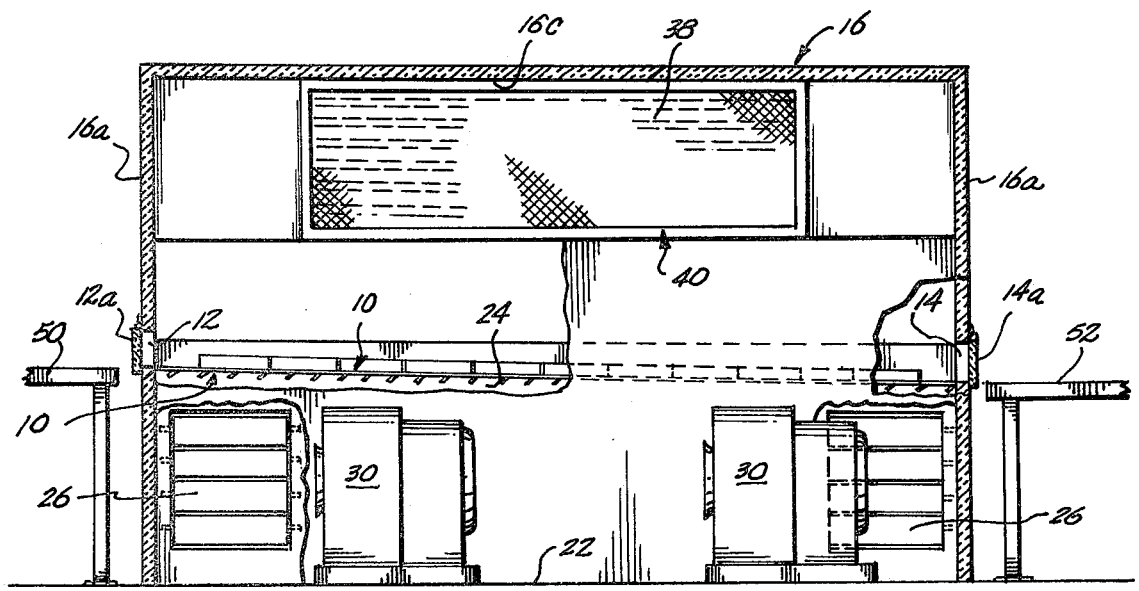
FIG. 2 is a sectional side view of the same.
Figure 4:
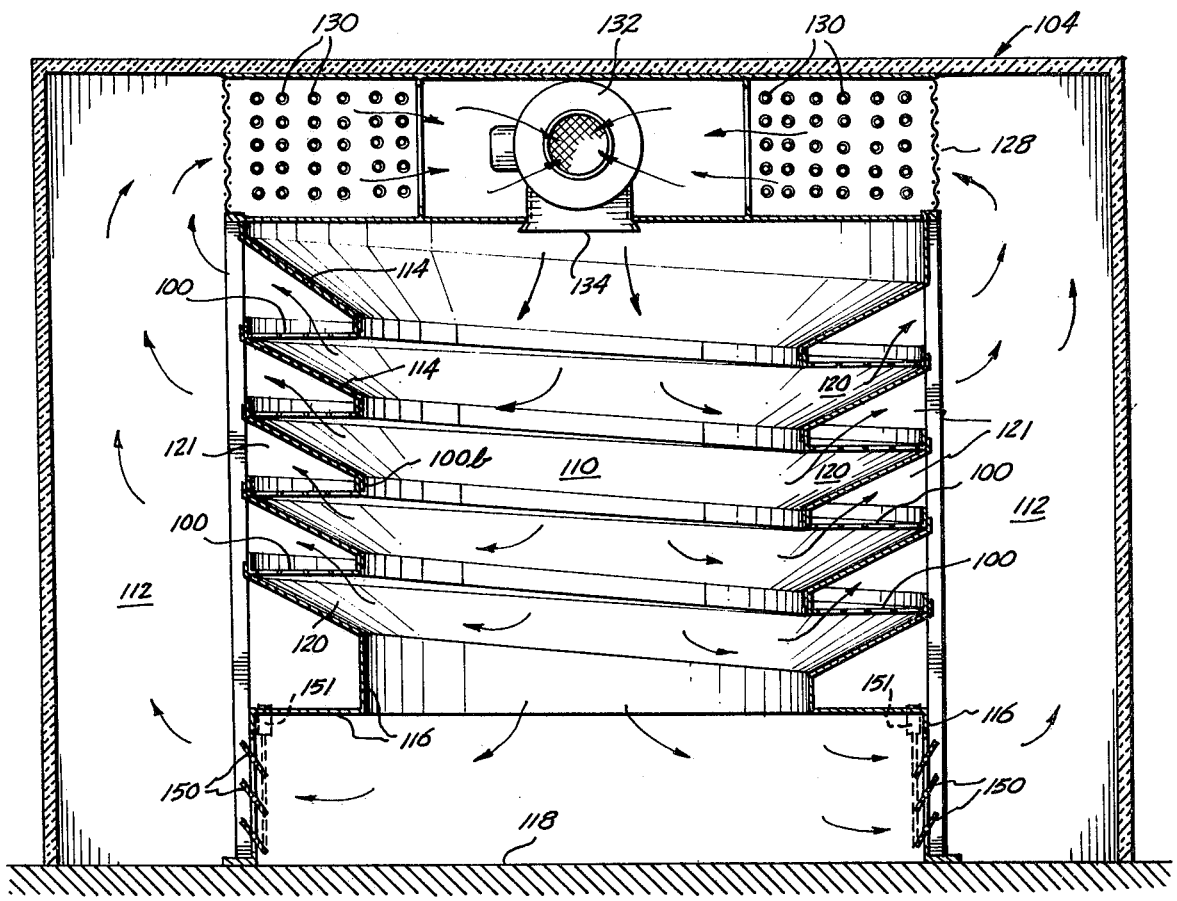
FIG. 4 is a sectional side view of the preferred embodiment of a highcapacity air slide conveyance freezer system according to this invention.
Figure 3A:
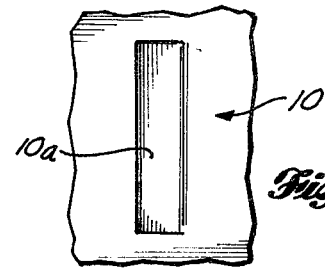
FIG. 3a is a view facing the conveyance deck to illustrate one suitable air flow directing orifice configuration that may be used in the conveyance deck for discharge of air against the comestible containers.
Figure 3:
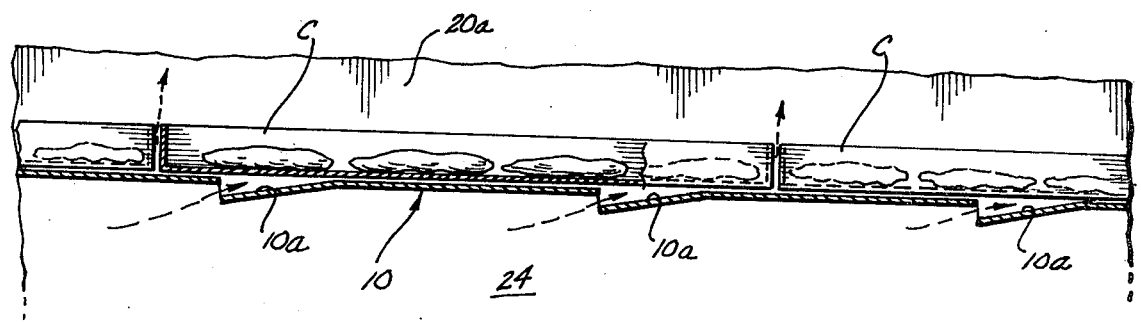
FIG. 3 is an enlarged fragmentary sectional side view of an apertured conveyance deck for freezing packages being conveyed as in FIGS. 1 and 2.
Figure 5:
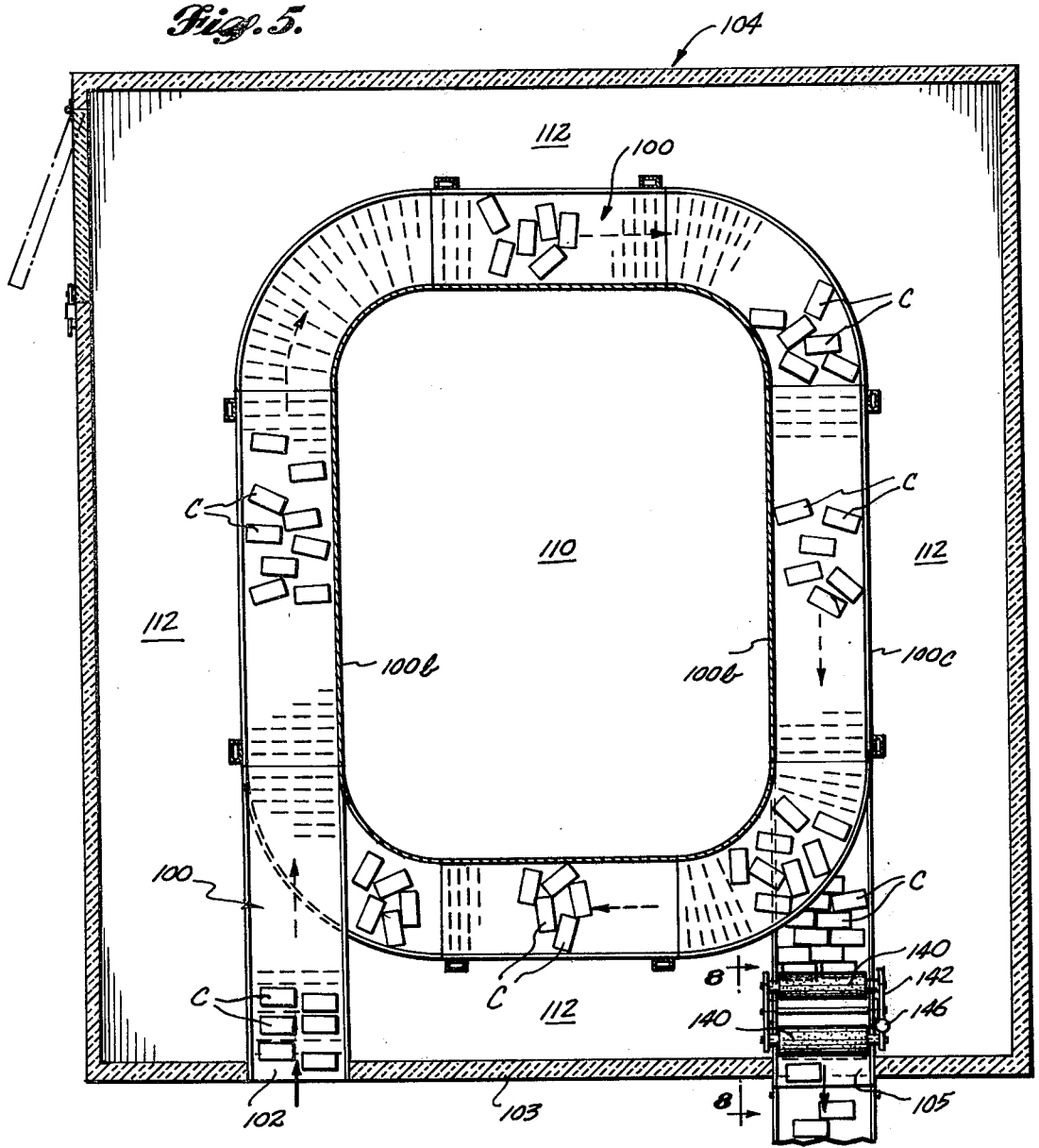
FIG. 5 is a plan view of the same with parts removed to simplify the view of the conveyance deck.
Figure 8:
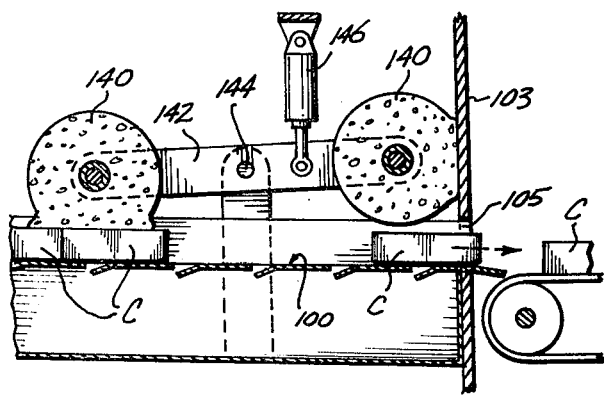
FIGS. 8 and 9 are operating views of the discharge gate mechanism by which the conveyed train of packages being processed in the freezer system are released for discharge by increments in the controlled succession.
Figure 9:
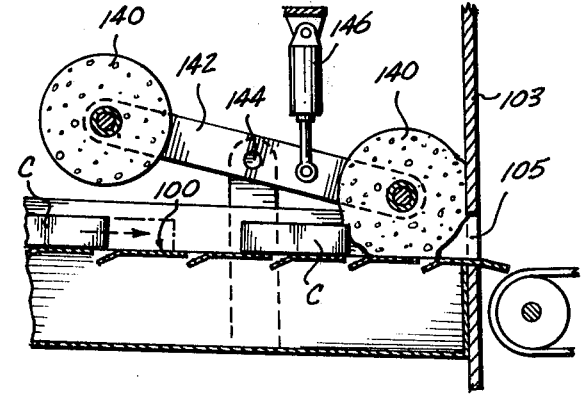
Figure 6:
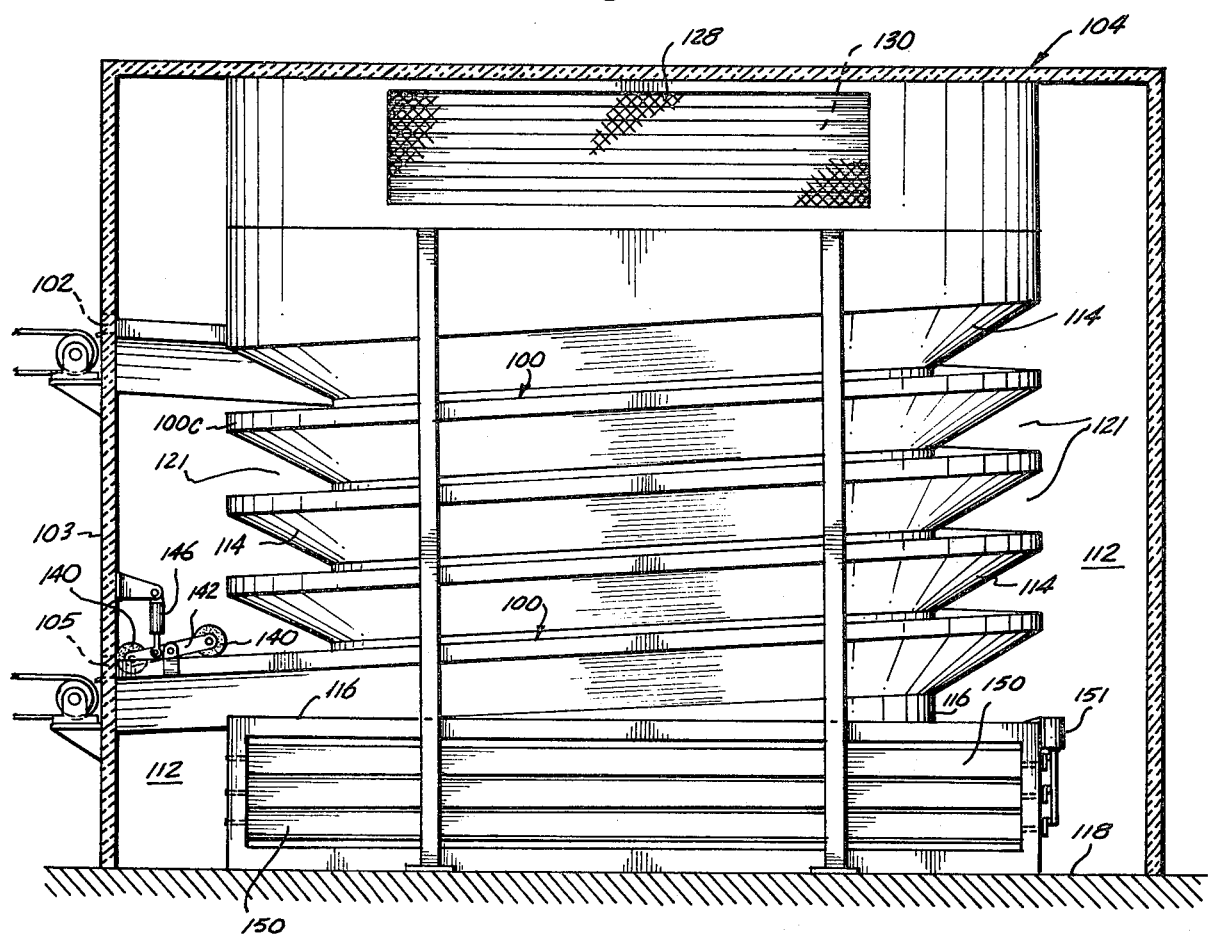
FIG. 6 is a sectional side view taken at right angles to the view of FIG. 4.
Figure 7:
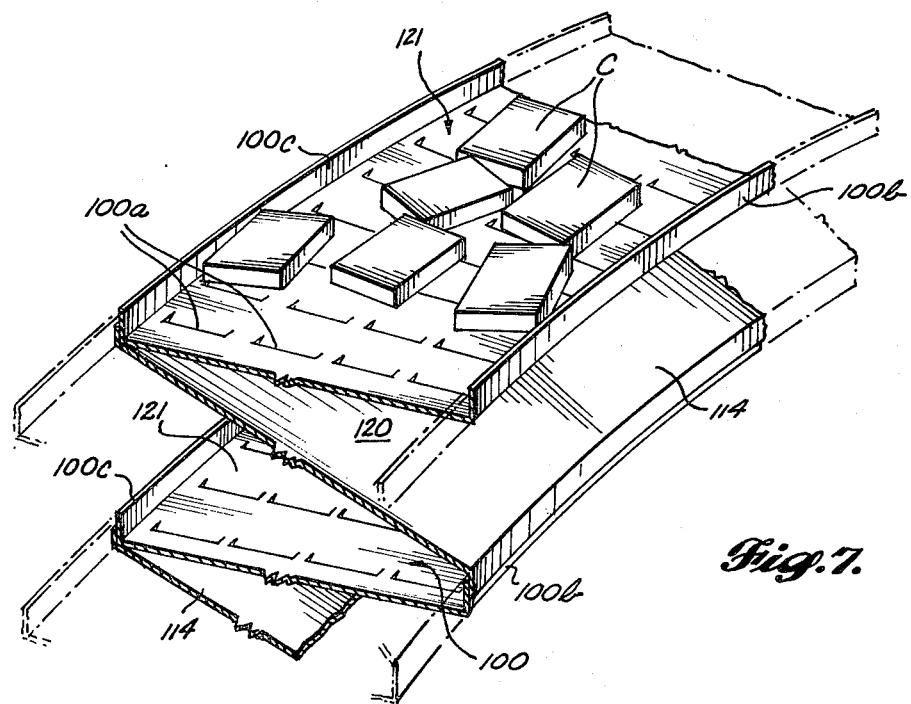
FIG. 7 is a fragmentary perspective view of a portion of the conveyance deck shown in FIGS. 4 to 6.

With reference to the simple or basic embodiment illustrating broad aspects of the invention as depicted in FIGS. 1 to 3, the generally flat conveyance deck 10 extends in a straight path at a slight downward incline from the inlet opening 12 to the outlet opening 14 in the respective end walls 16a and 16b of the insulated housing or enclosure 16. Longitudinally extending vertical partitions 18 and 20 cooperate with the end walls and floor 22 to form a single plenum 24 immediately underlying the deck 10. Details of a network of beams underlying and supporting the elongated sheet metal deck are omitted from the illustration, but will be understood to constitute a skeletal structure that leaves the deck panel largely exposed to the plenum space beneath. Motor driven blowers 30 are individually energizable to blow pressurized freezing air into the plenum through blower discharge openings 28 in the partition 18 so as to pressurize the plenum space beneath the deck. These blowers are mounted in a refrigeration apparatus chamber 32 that extends from the floor 22 to the ceiling 16c of the enclosure 16.

Above the conveyance deck 10, the enclosure 16 is open, as is a side walkway region 34 accessible through an entrance door 36 for persons to enter and observe the freezing operation applied to the train of comestible containers being conveyed on the conveyance deck 10. Freezer or evaporator coils 38 mounted across the face of an inlet opening 40 in the wall or partition 18 above the deck 10 cool the air being withdrawn by blower suction from the space above the conveyance deck 10 in its return to the chamber 32 for repressurization by the blowers 30. A large number of discharge openings 10a formed in the conveyance deck and distributed at intervals along the length thereof, as well as across the width of such deck, cause the freezing air under pressure to be delivered upwardly against the comestible containers C and preferably also in the direction of conveyance, that is, in the direction of downward slope of the conveyance deck.

Variably adjustable dampers 26 set in bypass openings in the partition 19 below the level of the deck provide a variable bypass control by which, with the blowers operating, it is possible to regulate the flow of pressurized freezing air in the plenum 24 passing through the deck apertures. The control means for adjusting the settings of the shutters 26 are omitted from the illustration, but may be of any suitable or conventional design. If desired, additional regulation or control over flow of pressurized freezing air through the deck apertures may also be adjusted by selective energization of one or both blowers and, if one is left inoperative, by permitting it to free-wheel or idle as an additional bypass, with or without variable dampers in its discharge opening, thereby further to regulate or vary the effectiveness of the bypass system. Adjustment in the setting of the variable dampers can be effected for establishing and maintaining full-volume air circulation through the blowers and evaporator coils at all times, thereby to maintain proper heat transfer between the air and evaporator coils. Otherwise, for instance if the entire air volume in the system were to be varied as the means of meeting the prevailing conveyor-freezing requirements (accommodating light or heavier product loading) the refrigeration system is unnecessarily penalized in heat transfer capability, efficiency and energy consumption. In other words the provision of such adjustable bypass dampers, whether set manually or automatically, permits the system to operate with full evaporator heat exchange efficiency while discharging air at the optimum rate through the discharge apertures in the conveyance deck to float and freeze the product rapidly without bouncing and jumbling the packages or containers.

While not essential to the basic operation of the system, there is an advantage in establishing the transverse width of the conveyance deck 10 so as to slightly exceed a multiple of the transverse dimension of the flat-bottom packages or containers C placed on the deck to span widthwise thereof. A slight upward extension 20a of the partition wall 20 serves aas a confining sidewall or retainer wall extending the length of the conveyance deck opposite the partition wall 18 also forming a retaining wall for the side of the deck. With this arrangement, pressurized freezing air underlying the conveyance deck 10 and blowing upwardly and longitudinally through the discharge apertures 10a escapes into the region above the conveyance deck by flowing beneath the comestible containers C and upwardly through the restrictive gaps between the abutting containers, as well as between the sidewalls 20a and 18 and the adjacent side surfaces of the containers at the sides of the train.

For convenience in loading and unloading the apparatus, comestible containers in the unfrozen state are brought into position adjacent inlet 12 on a loading table 50. A similar unloading table 52 is also provided adjacent the outlet 14. Suitable doors 12a and 14a normally cover the inlet and outlet openings to prevent escape of pressurized air from the enclosure. The lower door 14a can also serve as a stop holding back the train of comestible containers between times when it is opened to remove the bottom row.

In operation the apparatus is preferably loaded and unloaded, one or more rows of containerized comestibles at a time. At a point after each transversely extending row has reached the lower end of deck 10 it will have been subjected to the freezing effect of the system for the required period to permit its removal to the receiving table 52. Opening of door 14a and removal of one or more such rows allows the entire succeeding train of comestibles to descend incrementally by gravity, making space at the top for insertion of a corresponding number of unfrozen container units through door 12a at the deck's upper end. During the stepwise progressive sliding descent of the containerized comestibles on the deck 10, the pressurized freezing air discharging through apertures 10a preferably performs multifold functions. The formation of a thin layer of pressurized freezing air beneath the flat-bottom containers C raises the containers slightly from the deck surface and thereby substantially eliminates frictional restraint against gravity advancement of the train. Preferably the discharge orifice 10a are formed to direct the discharge at least partly lengthwise of deck 10 in the desired direction of conveyance. This, together with the friction-reducing effect, aids gravity in advancing the columns of containers.

Prior art air slide conveyors as such are not new, the concept appearing, for example, in various U.S. Patents for purposes that vary and in widely varied implementations. Those noted as background interest herein include the following: 545,013, Dodge; 662,574, McGary; 756,600, Dodge; 898,775, Norton; 1,051,905, McCord; 1,515,965, Pardee; 2,805,898, Willis; 2,848,820, Wallin et al; 3,131,974, Futer; 3,890,011, Futer; 3,180,688, Futer. However, in the combining of this air slide conveyance effect with flow-through freezing by means of the same pressurized air to perform both functions in the novel system of this invention, a number of distinctive benefits accrue that were not deemed obvious from prior art endeavors. Thus it turns out as previously stated that the airflow patterns attending air slide conveyance suspension of the flat-bottom comestible containers overlying the generally flat conveyance deck surface are inherently formed to achieve uniformly maximized rate of heat withdrawal from the containers, which rate increases as the conveyor loads become heavier, and require more freezing. It also turns out that this effect as a factor in reducing system size and cost is enhanced by loading the conveyance deck surface to the maximum extent possible. Such loading as depicted in FIGS. 1 and 3, for instance, tends to crowd the containers closely together such that air flow is not only narrowly confined to a region of rapid flow between the deck and container bottom surfaces, but is also confined to thin regions between side walls of closely abutted containers. A rapid and continuing scouring or air turn-over effect is thus enhanced by breaking up the boundary layers of otherwise stagnant air at the very container surfaces where heat transfer can be most effective. These are the surfaces where the contents lie in contact with the inside surfaces of the containers. Moreover the system avoids energy expenditures in inefficiently circulating large volumes of air across the top faces of the containers in an attempt to withdraw heat through the top walls of the containers and the immediately underlying insulating air gaps resulting from incomplete filling of the individual containers with comestibles. The arrows in FIG. 3 depict the pattern of airflow under and upwardly alongside the packages by maintaining positive pressure in the plenum beneath the conveyance deck and negative pressure in the collection space or chamber overlying the deck. With large open plenum and collection chambers extending under and over the full length and width of the emergence deck uniform continuity of this efficient utilization of pressurized freezing air throughout the advance of containers along the deck is assured. The heavier the containers per unit area, the greater the exerted upward pressure per unit area required to elevate the containers off the deck for frictionless conveyance. When this increased pressure is developed in the plenum and attendant discharge through the apertures by appropriate operation of the blowers and bypass shutters, the result is also to increase the rate of turn-over of freezing air in the supporting layer beneath the packages and in the interpackage layers. Consequently the system is essentially self-adjusting with respect to freezing rate when properly set as to the operating air pressure required to achieve the desired air slide conveyance effect, and vice-versa. Any suitable means (not shown) may be provided so as to maintain accumulated pressure in the plenum 24. Examples include regulating devices controlling blower speed, or controlling bypass damper position or both. Also, if a larger or smaller percentage of the total apertured surface area of deck 10 is covered by comestible containers tending to increase or decrease the accumulator pressure in the plenum, this too is accommodated by whatever means are provided to regulate accumulator pressure.

In the preferred and main high-rate production embodiment as depicted in FIGS. 4–9, the substantially transversely horizontal and longitudinally inclined conveyance deck 10 forms a substantially helical path of conveyance. Descending at substantially constant slope from its upper input end accessible through the container input opening 102 in one wall 103 of enclosure 104, the enlongated deck 10 undergoes a succession of turns to its lower end adjacent discharge opening 105. Preferably opening 105 is in the small wall 104. The term "substantially helical" is used with reference to the conveyance deck configuration to indicate that the conveyance path need not be precisely a helix nor even closely resemble a helix throughout its full length. In fact, in the preferred form the conveyance deck descends in a straight run from inlet opening 102 to the far corner 104a of the enclosure before the first descending curve of a 90 degree circular arc or bend occurs, whereupon it descends in a straight line to the second bend, and so around the completion of the first and succeeding turns of the looping path of conveyance, until in its last stretch in this example it descends in a straight stretch to the outlet opening 105. Thus, as viewed in plan the path of conveyance in the example constitutes a succession of straight sections in rectangular relationship alternating with connecting 90 degree circular bends together forming what have been denominated "turns" of a "substantially helical" configuration. Preferably the slope remains constant throughout the length of deck 100 and the deck is substantially horizontal transversely at all points along its length. However, some sections may be held flat or horizontal, such as in the corners or turns, such as for convenience of construction. Nor is it required that the upper and lower end stretches of the conveyance deck 100 terminate in the same wall of the insulating enclosure 104.

As shown, the inner and outer (opposite) side edges of the elongated deck panel 100 having upstanding retainer rails or sides 100b and 100c. These extend the full length of the deck in order to keep the free-sliding comestible containers C on the deck throughout their descent. As in the first example, these side walls 100b and 100c also serve to partially confine the upward flow of pressurized freezing air along the upright side walls of containers C after discharge beneath the containers through deck openings 100a. These openings 100a are or may be similar in their flow directing orifice configuration to those (10a) in the preceding embodiment. However, unlike the preceding embodiment employing a conveyance run extending in a straight line from end to end, the embodiment now under description has bends in the conveyance path. Consequently, the train of comestible containers cannot be kept in uniformly abutted rows and columns of containers in a more or less unbroken train. Instead at the bends the packages in this case, which themselves are usually rectangular or square in shape, necessarily assume varying spacings and skew angles even though they may return in some degree to an ordered and more closely and uniformly packed array in the straight stretches. It is preferred to have the advancing train of packages cover as much of the deck surface throughout the length of the deck 100 for reasons of achieving maximum utilization capacity of the system. To the extent idealized deck coverage by an unvarying closely abuttd package array overlying the entire deck area is not achieved, something less than optimized freezing efficiency is experienced. However, the system still operates substantially in the intended manner and the advantages to be gained as a trade-off by utilizing the substantially helical path configuration of the air slide conveyance deck are great in very important respects otherwise as previously indicated.

In the drawings, the descending column of turns of deck 100 surround an interior space 110 and in turn are surrounded by an exterior space 112. One of these spaces, much preferably the interior space 110, serves as part of a plenum in which pressurized freezing air is accumulated for distribution and discharge of the air against the containers to be simultaneously conveyed and frozen. The other space, in this example space 112, serves as a collecting chamber through which the discharging air is collected by blower suction uniformly applied in the regions overlying the conveyance deck and train of packages for recirculation back through the freezer apparatus and plenum 110.

Thus the interior of enclosure 104 is divided and actually separated basically into two main chambers 110 and 112 concentrically related. To a large extent this partitioning is formed by the substantially helical conveyance deck cooperating with a transversely inclined duct-forming panel 114 also of substantially helical configuration such that its outer edge is joined to the outer edge of the deck panel 100 and the inner edge also to the inner edge of the deck panel of the next underlying turn of the deck. The exception is with top and bottom turns where the duct-forming panel is secured to the overlying and underlying partition structure, respectively. In any event, each intermediate run of the inclined duct-forming panel cooperates with the conveyance deck portion above it to form an open-sided plenum duct space 120 that opens to the main plenum chamber 110 and converges transversely away from it. Such convergence represents an effective measure to conserve volumetric space in the conveyance deck columnar structure while assuring supply of freezing air to the discharge apertures at uniform flow pressures across the full width of the deck. Similarly the inclined duct-forming panel 114 cooperates with the deck portion underlying it to form duct space 121 that opens and diverges outwardly to the surrounding discharge air collecting chamber 112. Thus, the interests of space conservation are further served by inclining the duct-forming panel 114 while assuring flow-inducing withdrawal (negative) pressure being uniformly applied to all deck apertures across the full width of the conveyance deck. In this manner, the packages share alike in the air slide support and freezing effect of the available air uniformly throughout their journey from top to bottom of the conveyor deck run.

At the bottom of the hollow columnar, substantially helically formed conveyance deck structure there is annular panelling structure 116 that completes the partition or curtain between spaces 110 and 112, extending fully to the floor 118. A series of manually or automatically adjustable dampers 150 set by positioning actuators 151 are or may be installed in substantially annular panelling 116 to perform the deck aperture flow regulating functions referred to in connection with the preceding embodiment.

At the top of the conveyance deck structure the annular partition or curtain between spaces 110 and 112 is completed by wall structure 128 extending to the enclosure ceiling surrounding the labyrinth of freezer or evaporator coils 130 and blower units 132. The latter rests on a support structure including the cover panel 134 closing off the top of space 110. Air is drawn under suction by blowers 132 from collecting chamber 112 through the freezer coils 130 to reduce its temperature to the desired regulated value and thereupon is discharged downwardly through outlet 134 under pressure into the plenum 110.

In operation the blower 132 creates positive pressure of freezing air in the central plenum space 110 and its adjoining branch duct spaces 120 beneath all stretches or portions of the conveyance deck 100. Negative pressure is also created by the blower in the collecting chamber 112 and its branch duct spaces above all stretches or portions of the conveyance desk 110. By the time containerized comestibles on deck 100 have slid under gravity progressively downward to outlet 105 the comestibles will have been properly frozen and ready for discharge. Just inside the housing adjacent the outlet 105 an elongated horizontally mounted stop element shown as roller 140 or equivalent is mounted. In its normal position this roller, which is preferably of soft spongy material seals the opening across its full width to prevent loss of freezing air. This it does by pressing against the upper rim of opening 105 in the wall 103 and simultaneously the deck 100. This, preferably freely-rotational roller is mounted on the downstream end of a rocker frame 142 carried by a horizontal transversely oriented pivot shaft 144 permitting it to pivot intermediate its ends. A second stop element shown as roller 144 or equivalent is mounted on the opposite end of pivoted frame 142 and is normally held thereby above the deck sufficiently to clear the containers C so that they may slide beneath it to abut the stop roller 140. Thus, the roller 140 functions in its normal position, both to hold back the advancing train of packages on deck 100 and to close the discharge opening 105. An actuator 146 connected to rock the pivot frame 142 about shaft 144 may then be operated to reverse the positions of the two stop elements 140 and 142 momentarily. In so doing roller 144 descends to bear on the transverse row of packages underlying it. At that point those packages on deck 100 that lie beyond stop roller 144 are released for discharge by raising of roller 140, whereas roller 144 arrests advance of the remainder of the package train. After the incremental discharge interval the actuator reverses to restore the stop elements to their normal positions preparatory to repeating the process. The train of packages or containers is thus advanced by progressive increments as packages are released one or more rows at a time at the lower end and new or unfrozen ones added to the train at the upper end to keep the process a continuous one.

In the preferred embodiment the space surrounding the helically formed conveyance deck constitutes an inspection walkway through which a person may observe and troubleshoot any problems experienced with the packages properly advancing along the deck. In this regard it will be noted that the open-sided configuration of the conveyance deck spaces is inherently convenient to observe and gain ready access to the product at all points along the run of such deck.

Figure 11:
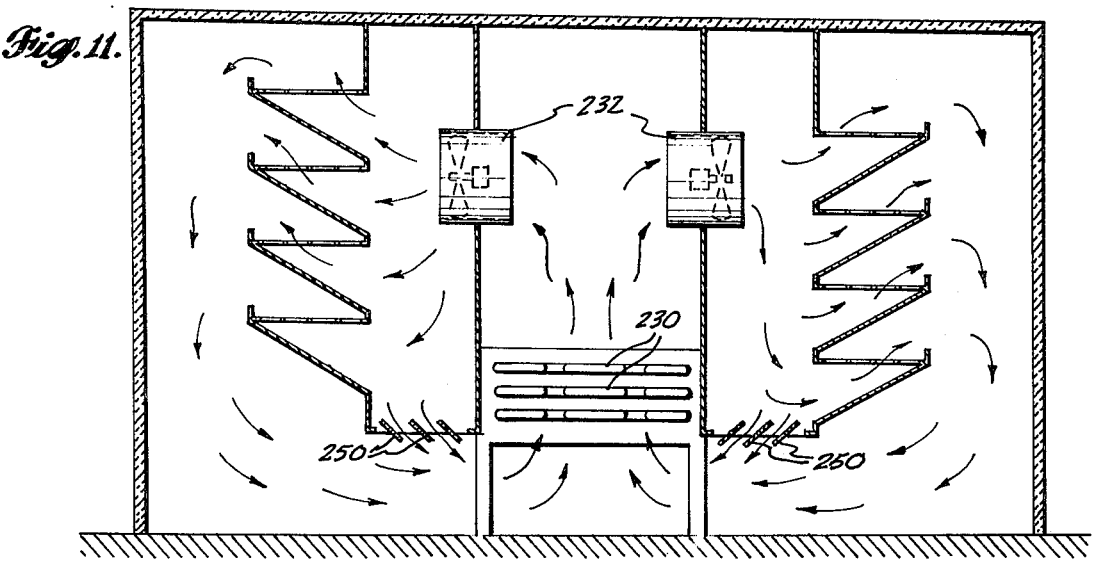
FIGS. 11, 12 and 13 are views similar to FIG. 4 showing modified blower and plenum arrangements in such a system.
Figure 12:
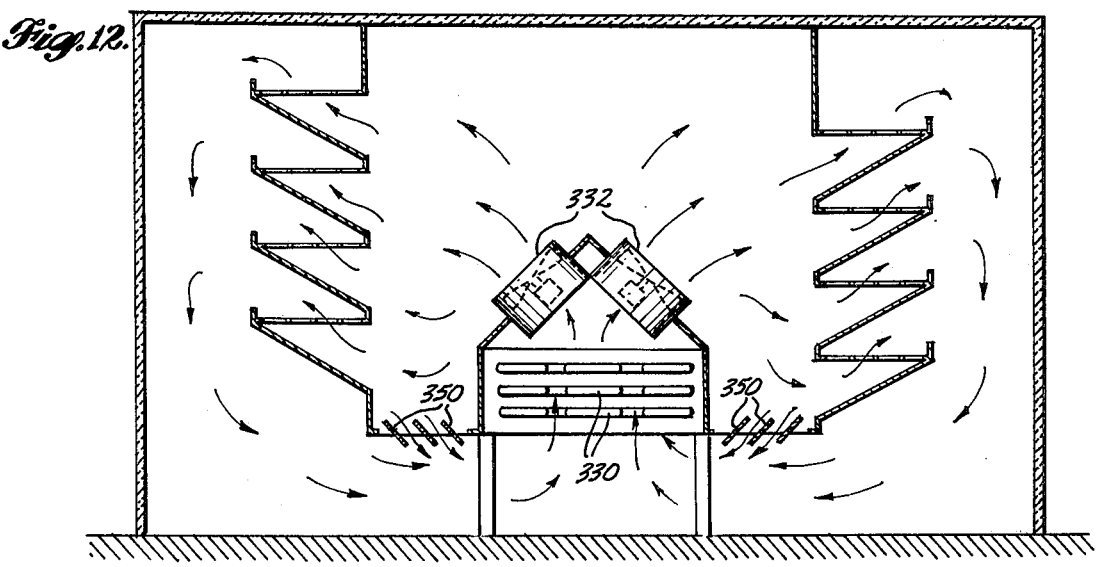
Figure 13:
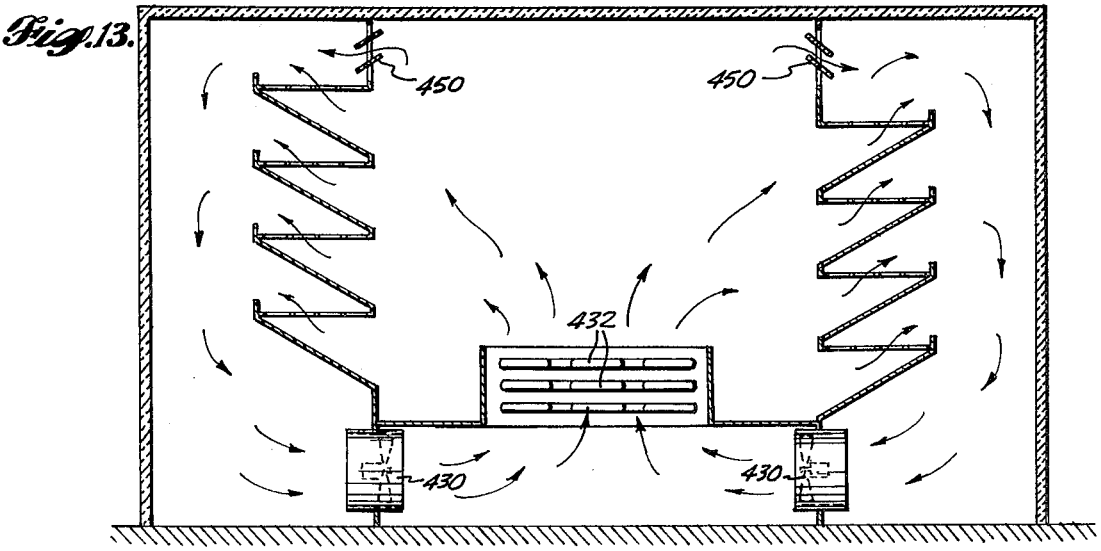

In the modified embodiments of FIGS. 11, 12 and 13 different arrangements of the evaporator coils, blowers and variable bypass dampers are depicted. In FIG. 11 the dampers 250 are placed in a bottom wall of the conveyance deck plenum pressurized by blowers 232 mounted in an inner tubular wall of the plenum. The evaporator coil assembly 230 is mounted centrally beneath the interior space defined by such tubular wall to be traversed by return airflow coming from the conveyance duct spaces and from the bypass openings through dampers 250.

In FIG. 12 the tubular wall is foreshortened and capped by sloping panels converging to a peak with the blowers 332 mounted in the sloping panels overlying the evaporator coils 330. The dampers 350 are located similarly to those in FIG. 11. An open framework supports the duct-deck assembly from the floor.

In FIG. 13 the blowers are mounted immediately above the floor in upright wall panels supporting the duct-deck assembly. Evaporator 432 is centrally mounted in a horizontal panel structure immediately above the space into which the blowers discharge and that opens upwardly into a central plenum through the evaporator. The dampers 450 are mounted in upright panels extending downward from the ceiling panel to the duct-deck structure.

The invention having thus been described illustratively in its preferred forms, it will be appreciated that the novel concept is to be interpreted in scope in accordance with the claims stated below.

The embodiments of the invention in which an exclusive property or privilege is claimed are defined as follows:

1. A system for freezing of comestibles prepackaged in substantially flat bottom storage containers, said system comprising conveyor deck means including an elongated substantially flat stationary conveyance surface extending longitudinally from a container input location to a container output location and adapted to support thereon a plurality of such containers distributed over its length between said locations, said conveyance surface having a plurality of air discharge apertures therein distributed over its length at locations to underlie said containers, air freezer means including heat exchange means, blower means and associated closed air recirculation means cooperable to freeze and pressurize and to recirculate the pressurized freezing air continuingly in a path that includes plenum space beneath said surface wherein the air is pressurized for upward flow through said discharge apertures and collecting space overlying said surface for return of air to the suction side of said blower means, thereby to form and maintain beneath each container a bearing film of freezing air flowing outwardly from between said conveyance surface and the bottom of each container, the film air pressure being effective to elevate said containers slightly above said surface to permit substantially frictionless advancement of the containers over said surface, and the film airflow velocity relative to each container being effective to transfer heat rapidly from the containers and thereby from the comestibles therein, and means to effect substantially concurrent progressive advancement of said film-borne containers in the direction from said input location to said output location at a controlled average rate substantially negligible in relation to said film air flow velocity, whereby rate of heat removal from the comestibles is substantially independent of such advancement rate including variations therein.

2. The combination defined in claim 1, wherein the discharge apertures are formed with a flow directing configuration that directs the discharging air both upwardly and in the direction of conveyance.

3. The combination defined in claim 1, further wherein the conveyance surface is sloped downwardly in the direction from said input location to said output location, whereby the film-borne comestible containers tend concurrently to slide by gravity toward said output location.

4. The combination defined in claim 3, wherein the discharge apertures are formed with a flow-directing configuration that directs the discharging air both upwardly and in the direction of conveyance.

5. The combination defined in claim 3, including means for introducing containerized comestibles onto said deck surface in succession at said input location, gate means adjacent the said output location having a normally closed position for holding back the conveyed succession of containerized comestibles, and means intermittently operable to actuate said gate means to an open position momentarily to permit a limited number of comestible containers in said succession to pass said gate means during each such momentary opening for removal from said deck surface.

6. The combination defined in claim 5, wherein said gate means comprises cooperating stop elements spaced apart lengthwise of said deck, surface means alternately and oppositely actuating said stop elements into and from positions alternately arresting conveyance of the comestible containers on said deck surface and releasing the same for conveyance, respectively.

7. The combination defined in claim 3, wherein the deck surface extends in a substantially straight line from one end to the other.

8. The combination defined in claim 3, wherein the deck surface extends from its input location in a descending substantially helical path to its output location, said substantially helical path forming a succession of descending turns lying substantially one under another and surrounding and defining a central interior chamber.

9. The apparatus defined in claim 8, wherein the closed air recirculation means includes elongated panel means of substantially helical form co-extending lengthwise with said deck surface and having outer and inner edges joined respectively to the outer and inner edges of respective descending turns of said deck surface whereby plenum space beneath said deck surface opens laterally thereof into said central interior chamber and wherein the air collecting space overlying said surface opens laterally outward therefrom, enclosure means surrounding and spaced outwardly from the helical deck to form an outer chamber into which said collecting space opens.

10. The system defined in claim 1 wherein the associated closed air recirculation means includes a by-pass around the air discharge apertures and combines the air passing through said apertures with the air passing through the by-pass for substantially full airflow through the heat exchange means, said by-pass having adjustable flow control means therein to adjustably vary the resistance to flow of air through the by-pass.

11. The method of preparing comestibles for frozen storage comprising placing the comestibles in a plurality of substantially flat bottom containers, depositing the containers in succession on an elongated, substantially flat support surface to form a train of substantially abutted containers extending lengthwise of said surface, with said surface having a plurality of air discharge apertures distributed at intervals lengthwise thereof beneath said containers, blowing pressurized freezing air upwardly against said containers through said apertures under a pressure that slightly elevates the containers from said support surface by forming a friction-reducing layer of pressurized air flowing outwardly from between the support surface and the containers, and advancing the thus elevated containers progressively lengthwise of said support surface at a controlled average velocity independent of and low in relation to velocity of air flowing outwardly in said layer, while drawing pressurized freezing air from said friction-reducing layer upwardly along the sides of said containers, and recirculating the air after refreezing and repressurization for discharge through said apertures continuingly as the train of containers is advanced along said surface, thereby to freeze the comestibles in the containers.

12. The method defined in claim 11 in which the elongated support surface is sloped downwardly lengthwise thereof and the comestibles containers are allowed to advance thereon by force of gravity while suspended on said layer of pressurized freezing air, and wherein the containers are arrested by holding back the leading containers and allowing passage of such leading containers in successive order at a controlled rate, thereby to control such average velocity.

13. The method defined in claim 12 in which the train of packages extending lengthwise of the support surface is laterally confined at opposite side edges of said surface by side surfaces adjoining the same that closely adjoin the packages at opposite sides of the train, thereby to confine the flow of air withdrawn from said layer along said opposite sides of the train of packages as well as between packages successively abutted lengthwise in the train.

14. The method of claim 11 including the step of adjustably by-passing the apertures to vary the flow of air through such apertures, thereby to accommodate changes in loading of the support surface by the comestible containers while combining the by-pass and the aperture discharge flow for refreezing and repressurization of the combined flows.

* * * * *